UNITED STATES PATENT OFFICE.

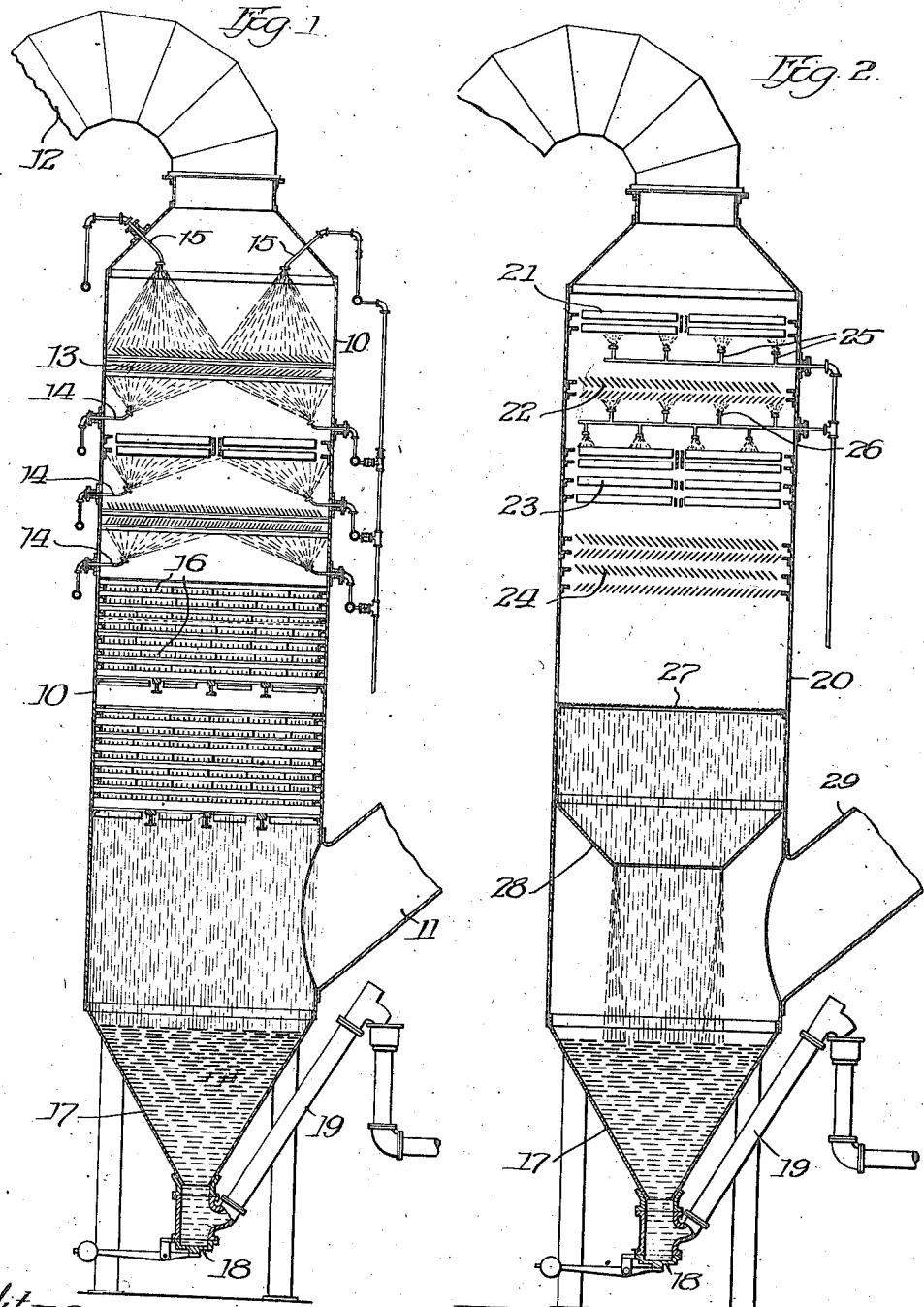

HERMANN A. BRASSERT, OF CHICAGO, ILLINOIS.

GAS-WASHER.

1,169,766.

Specification of Letters Patent.   Patented Feb. 1, 1916.

Application filed October 2, 1915.   Serial No. 53,779.

*To all whom it may concern:*

Be it known that I, HERMANN A. BRASSERT, a citizen of the United States, and resident of Chicago, in the county of Cook and State of Illinois, have invented certain new and useful Improvement in Gas-Washers, of which the following is a specification.

This invention relates to gas washing and refers to the apparatus used in connection with the method of washing gas in two stages for which I have filed application for Letters Patent, Serial No. 36,818, filed June 28, 1915.

While my invention is particularly adapted to use in connection with washing gas from blast furnaces, it may be used for cleaning gas of any description which contains mechanical impurities, such as soot, flue dust or the like.

Gas washing towers as heretofore constructed have used either one or more sprays applied at or near the top, causing a rain of water to fall down through the entire height of the tower, which in some cases is arrested by screens placed at different levels of the tower; or they have been of the baffle type, in which the gas travels upward in a tortuous path and meets heavy cascades of water overflowing the baffles; or they have been of the Zschocke construction in which water is applied to distributers at the top of the tower, and so designed as to spread the water evenly over wooden hurdles arranged in rows and sets and forming multiple passages through which the gas flows vertically, the walls of the passages being parallel to the movement of the gas, the object of the hurdles being to break up the gas and water in order to insure a more intimate contact between them.

The difficulty in designing and operating gas washers is to obtain perfectly clean gas and yet not clog up the apparatus. The gas will be the more thoroughly cleaned the more it is broken up and forced to travel through narrow passages and the more friction it is subjected to in its passage, but these same conditions induce the rapid clogging of the washer. The Zschocke hurdle design, as well as the other simple type of spray towers, have proved efficient only for accomplishing the rough washing of the gas. Owing to the straight passages and the parallel walls of the Zschocke hurdles, clogging is not liable to occur even with the muddiest water and the dirtiest gas, providing that sufficient water is applied at the top of the hurdles and the distribution of the water is even over the entire area of the hurdles. However, experience has shown that the Zschocke construction does not accomplish perfect washing, the parallel hurdles not being capable of removing the finest particles of dust from blast furnace gas. I have, however, found that by enveloping the gas in a mist of water, and simultaneously impinging it in its saturated state successively against rows of baffles presenting their face angularly against the flow of the onrushing gas, even the finest particles of dust are eliminated. Every particle of gas and with it every particle of dust, howsoever fine, is made to become intimately associated with water, and upon striking the baffles in its moist condition it adheres to their surface. Thus a thin film of slime forms on the baffles, which, however, must be immediately and continually washed off in order to prevent clogging.

The construction of the apparatus will be better understood by reference to the accompanying drawings, wherein—

Figure 1 is a vertical section through a washer such as contemplated by me, and Fig. 2 is a similar section taken through a slightly modified form of the same construction.

The vertical cylindrical shell 10 is provided with a gas inlet 11 and a gas outlet 12. Rows of wooden slats 13, are set diagonally across the tower in tiers, each successive tier being placed at 90 degrees to the preceding one. The slats are inclined at angles averaging about 45 degrees, the slats in the lower tiers preferably being less inclined than those in the upper tiers. The purpose of increasing the inclination of the baffles toward the top of the tower is to increase the impinging action of the gas against the baffle surfaces, so that the cleanest gas meets with the most thorough cleaning process. By placing two rows of baffles in each tier, the direction of the gas is quickly changed between each row of a tier, which further aids in the precipitation of the suspended matter at that point, although I do not confine myself to the use of double rows of slats, single rows being used with good success.

In order to obtain a high degree of cleanliness of the gas, it is necessary that every slat surface be covered with a film of water. In order to assure this to the fullest degree I employ a series of spray nozzles so designed and so placed that they cover the entire baffle surfaces in each row and tier. I prefer to place a set of these nozzles 14 below each tier of baffles, spraying with the flow of the gas, and another set 15 above the top row of baffles spraying downward against the flow of gas. I have found that this method of spraying gives the best effect with the least amount of water.

The sprays are individually connected to the water supply system, and each one provided with a separate valve outside of the tower, so they can be individually or collectively shut off and cleaned out while the washer is in operation.

The water sprayed in the upper part of the tower and collected on the baffles drops off the lowest row of baffles in a heavy rain into the lower part of the tower, in which I accomplish the rough cleaning, preferably by employing the well-known Zschocke system of hurdles. These hurdles consist of a plurality of rows of vertical slats 16, and I prefer to employ a relatively large number of these vertical slats, as shown in Fig. 1. These wooden slats, being placed in a vertical position, do not tend to become clogged, although they serve to break up the gas and water and bring the suspended solids into contact with the water a plurality of times in the ascent of the gas. After leaving the hurdles 16, the water falls in the form of a heavy rain into the conical lower portion of the washer, and it is at this point that the preliminary rough washing of the gas takes place. The gas entering through the opening 11 is caused to ascend trough the falling rain and the heavier particles which are carried in suspension are washed out at that point. The bottom of the tower consists of a cone 17 designed with a sufficiently steep angle, preferably 60 degrees, so as to prevent any solids from building on its slope. The cone is closed at its bottom by a suitable valve 18, preferably of the sliding type, through which the washer can be emptied when desired. Above this valve is a permanent outlet connecting with a discharge pipe 10, through which the waste water from the tower flows continuously. The discharge pipe is bent so as to form a seal which prevents any gas from escaping.

In the construction shown in Fig. 2 the shell 20 is substantially the same as that shown in Fig. 1, and in the upper portion of the shell I provide diagonally disposed baffles arranged in four tiers, 21, 22, 23, 24. The sprays 25, 26 are arranged slightly different from those shown in Fig. 1, water being sprayed on the lower portion of the upper baffles and not on the top thereof. Beneath the lower series of baffles 24 I provide a screen 27. The water falling from the baffles onto this screen is re-distributed in the form of a shower or rain through which the water passes to the cone 28, having a concentric opening smaller in diameter than the main casing. The water passes through this opening into the conical lower end of the casing. The gas entering in a downward direction through the inlet 29 is turned upward and re-distributed by the cone 28 and is caused to pass through the rain, the heavier particles being washed out in that operation. Passing upward, the gas contacts the diagonal baffles and is washed clean, the same unit of water coming in contact with the gas many times in its descent. It will be understood that the casing above the conical lower end is substantially forty-five feet in height and that the gas passing upward is constantly in contact with water, the same unit of water being employed a plurality of times before it reaches the bottom.

I claim:

1. In gas washing apparatus, the combination of a vertical shell, means in the lower portion of the shell for subdividing the water passing through the shell into the form of a rain, and a plurality of tiers of diagonally-disposed baffles in the upper portion of the shell, substantially as described.

2. In gas washing apparatus, the combination of a vertically-disposed shell, means for supplying water to the upper portion of the shell, means in the lower portion of the shell for inducing a rain or shower of water, the water falling at an angle to the line of motion of the gas as it enters the casing, and a plurality of series of diagonally-disposed baffles in the upper portion of the tower, substantially as described.

3. In a vertical gas washer, the combination of a lower section containing means for bringing gas in contact with a shower of water, and an upper section containing a plurality of angular baffles sprayed with water against which the gas impinges on its upward path, substantially as described.

4. In a vertical gas washer, the combination of tiers of vanes placed in the upper part of the tower and inclined to the flow of gas, and means for spraying same from above and below, means for causing the water collected on these vanes to be distributed evenly, forming a heavy rain throughout the lower section of the washer, substantially as described.

5. In a vertical gas washer, the combination of a shell, a plurality of tiers of slats arranged parallel to the flow of gas and contained in the lower portion of the washer, and a plurality of tiers of slats inclined toward the flow of the gas and contained in the upper part of the washer, substantially as described.

6. In a gas washer, the combination of a shell, a plurality of rows of vertically disposed slats in the lower portion of the shell, and a plurality of rows of inclined slats in the upper portion of the shell, means for spraying water onto said upper slat, substantially as described.

Signed at Chicago, Illinois, this 25th day of September, 1915.

HERMANN A. BRASSERT.

Witnesses:
D. V. MEDALIE,
J. W. W. MILLAN.